(12) United States Patent  
Nyman (10) Patent No.: US 6,694,459 B1  
(45) Date of Patent: Feb. 17, 2004

(54) METHOD AND APPARATUS FOR TESTING A DATA RETRIEVAL SYSTEM

(75) Inventor: Noel Nyman, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/231,470

(22) Filed: Jan. 14, 1999

(65) Prior Publication Data (65)

(51) Int. Cl.[7] .............................................. G11C 29/00
(52) U.S. Cl. ......................... 714/718; 707/4; 714/800; 714/807
(58) Field of Search ................................ 709/245, 242, 709/230, 328; 369/53.35; 716/2, 4, 18, 5; 707/8, 4, 10, 5, 102, 3, 2, 1, 9; 714/807, 752, 52, 755, 770, 733, 718; 379/211.02; 704/4; 345/700

(56) References Cited

U.S. PATENT DOCUMENTS 5,805,799 A * 9/1998 Fredrickson et al. ........... 714/52
5,901,214 A * 5/1999 Shaffer et al. ............ 379/211.02
6,279,140 B1 * 8/2001 Slane ........................... 714/807
2001/0046196 A1 * 11/2001 McKernan ................ 369/53.35

OTHER PUBLICATIONS

NN9607231: Encoded Security Feature for Digital Images, IBM Technical Disclosure Bulletin, Jul. 1996, US; vol. 39, pp: 231–234.*

NN9607231: Encoded Security Feature for Digital Images, IBM Technical Disclosure Bulletin, Jul. 1996, US; vol. 39, pp: 231 234.*

* cited by examiner

Primary Examiner—Albert Decady  
Assistant Examiner—Guy Lamarre  
(74) Attorney, Agent, or Firm—Leydig, Voit & Mayer, Ltd.

(57) ABSTRACT

A method for testing data retrieval systems that uses codes embedded within the test data set to confirm that retrieved data is legal, valid, is the right type of data, belongs to the right owner, and is accurate. The embedded codes and translation keys are created simultaneously with the data set. The codes are imported along with the data by the retrieval system being tested, and then compared to the expected values based on the translation keys.

32 Claims, 10 Drawing Sheets

| | |
|---|---|
| <employee number> 0002000 | 301 |
| <email alias>YagParAM | 303 |
| <first name>Yagash | 305 |
| <last name>Pari | 307 |
| <room location>28/1916 | 309 |
| <work phone>(897) 877-4590 | 311 |
| <job title>Job Title 999 | 313 |
| <works in>Work Group 9 | 315 |
| <reports to>0000105 | 317 |

| |
|---|
| <employee number> 0002000K |
| <email alias>YagParAMkxwxx00020000098765K |
| <first name>Yagash kxxxw00020000001234K |
| <last name>Pari kxxwx00020000005678K |
| <room location>28/1916kwxxx00020000001111K |
| <work phone>(897) 877-4590kxxww00020000003333K |
| <job title>Job Title 999kxwxw00020000004444K |
| <codes>qwwww0002000KxxwxxWork Group 9xxxxw0000105K |
| <works in>Work Group 9 |
| <reports to>0000105K |

METHOD AND APPARATUS FOR TESTING A DATA RETRIEVAL SYSTEM

TECHNICAL FIELD

This invention relates generally to testing data retrieval systems and, more particularly, relates to testing data retrieval systems using verification codes embedded within a data set.

BACKGROUND OF THE INVENTION

Testing a data retrieval system involves generating test data and submitting a preselected set of test queries. Present testing schemes verify the accuracy of query results by consulting an "oracle." An oracle is a reference known to the tester to be correct. If stored electronically, oracle data is formatted so that a test program can access it. Every time an entry in the test data set changes, the tester must update the oracle accordingly. If the oracle is damaged or destroyed, a new one has to be created from the original test data set, otherwise the test data set must be discarded. If the test data set is large and made up of random characters, as is often the case, creating a new oracle is nearly impossible, since testers won't be able to distinguish good data from bad. Thus, the use of oracles in data retrieval system testing is unwieldy and time consuming.

SUMMARY OF THE INVENTION

The present invention provides an apparatus and method for testing a data retrieval system that eliminates the need for an oracle. Specifically, the invention embeds verification codes into a test data set and interprets the codes after they have been retrieved along with data entries by a data retrieval system. The verification codes are made up of characters that the data retrieval system can process. For example, if the data retrieval system can only process alphanumeric characters, then the codes are made up of alphanumeric characters. The invention also performs a checksum, Cyclical Redundancy Check (CRC), or similar algorithm on retrieved data to verify accuracy.

The invention performs up to five levels of verification. These levels correspond to five basic questions asked by testers when gauging the success of a test data query: (1) Did the system retrieve a data set and is it the correct data set? (2) Is this data valid, or is it data that should have been deleted or updated? (3) Is this the kind of data that was supposed to be retrieved? (4) Was the data retrieved from the correct record? (5) Is the data accurate?

The invention need not use all of these verification levels in any particular test. The verification levels may be implemented in combinations, depending on the testing technique used and desired level of certainty. The invention uses embedded codes for level 1–4 verification, while performing a checksum, CRC, or similar algorithm on the actual data values for level 5 verification. Test queries according to the invention are structured so that the data retrieval system retrieves the corresponding codes along with the data.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
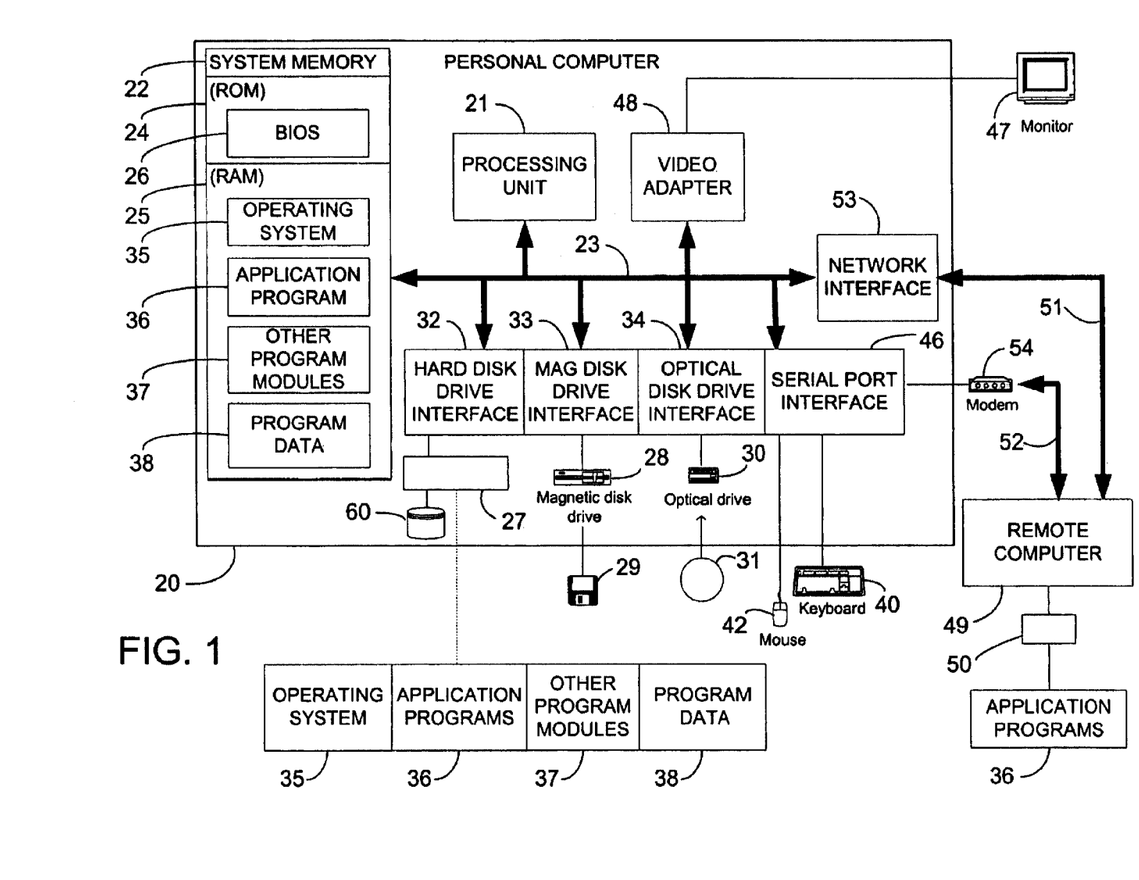
FIG. 1 is a block diagram generally illustrating an exemplary computer system on which the present invention resides.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in the ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data is 5 that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

A "data retrieval system" is designed to locate and retrieve information.

Examples of data retrieval systems include database, spreadsheet, word processing, presentation, Internet, and World Wide Web programs. The collection of information accessible by a data retrieval system is known as a "data set." Many different types of data can be represented by a data set. For example, a data set can represent the employees of a company, taxpayers in a particular city, snowplows in a highway department motor pool, counties in a state, lines of text in a document, slides in a presentation, or text on a Web page. A data set is normally divided into rows or "records" and columns or "fields" in which each record contains information about an individual member of the data set and each field is a category of information. The information stored in each field for a particular record is the "data value" for that field. An exemplary data set 200 in FIG. 2 concerns taxpayers, and therefore a record 201 has a field for the taxpayer's first name (203), last name (205), adjusted gross income (207), number of dependents (209), and so on. The data values contained in the fields are "Smith," "John," "30000.00" and "2" respectively.

Figure 3:
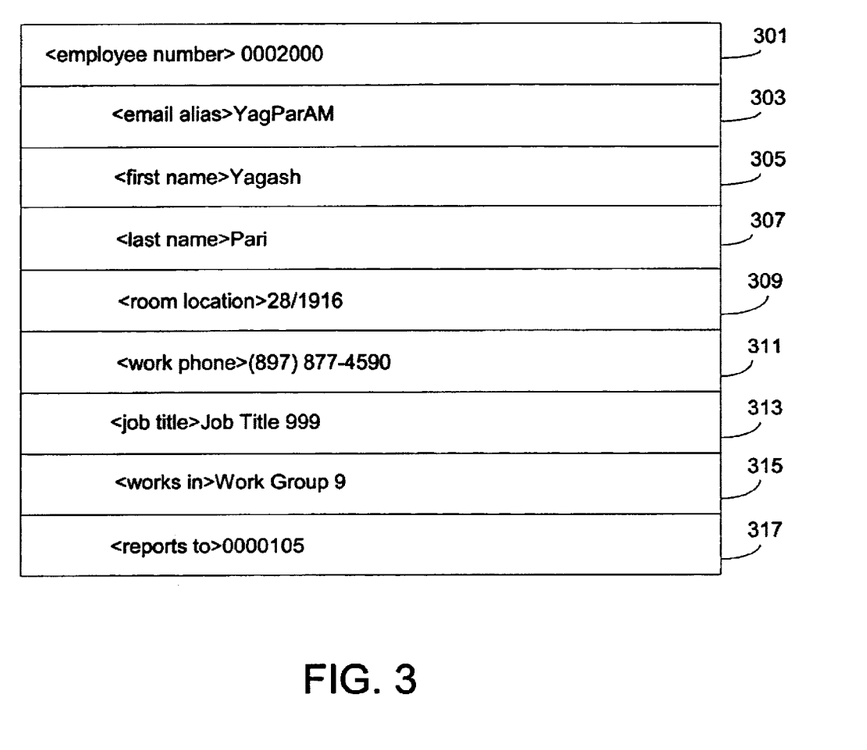
FIG. 3 shows an exemplary record of a conventionally formatted data set.

A conventional record shown in FIG. 3 contains information about an individual employee in a company. The record is divided into several fields. A field 301 is called "employee number" and uniquely identifies the employee. A series of fields 303 through 313 contains data values regarding the employee's email alias, first name, last name, room location, work phone, and job title. The fields 315 and 317 assign values to "works in" and "reports to," reflecting the employee's work group name and manager's "employee number" respectively.

Figure 4:
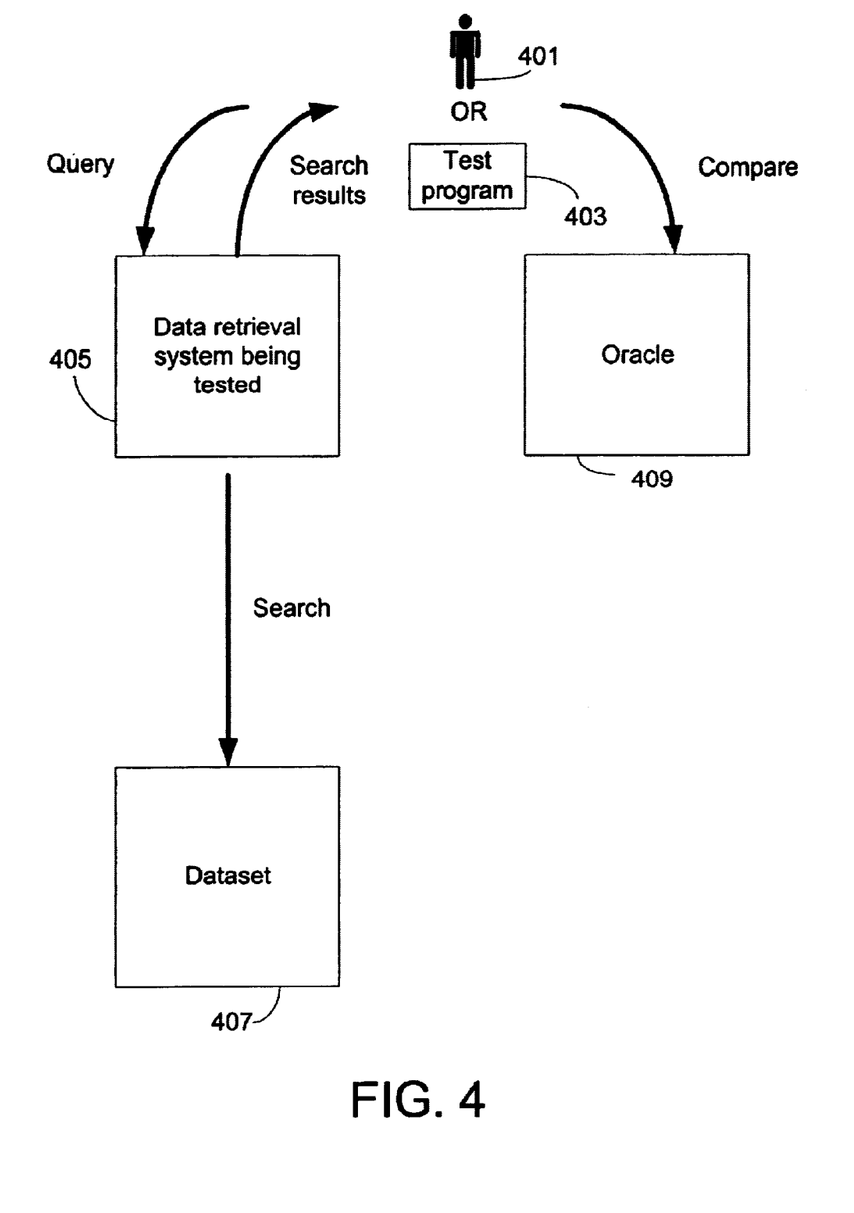
FIG. 4 illustrates a conventional method of testing a conventional data set.

A conventional method of testing data sets is to use an "oracle," as shown in FIG. 4. An oracle is a knowledge base containing the "correct" response to a query. Any implementation of an oracle will work as long as it can be reasonably relied upon for accurate information. For example, if the data set contains information well known to the tester (such as the names and job titles his/her co-workers), then the tester would, in effect, be the oracle. If the data set is not well known to the tester, contains many records, or contains randomly sequenced characters (a common testing technique), a more sophisticated oracle is required, such as a hard copy employee directory, or even a second data set accessed by an older, verified data retrieval system.

Using one of the conventional methods described, a human operator 401 or an automated test program 403 submits a set of data queries to a data retrieval system 405. The queries are constructed according to well known techniques to maximize the possibility of uncovering any bugs that might exist in the data retrieval system. The data retrieval system 405 searches a data set 407 according to the queries and returns the results. The operator 401 or test program 403 must then compare the results to an oracle 409 to determine whether each query was correctly performed.

The search results of FIG. 4 are evaluated according to the following five criteria or "levels:"

(1) Legality. Is the data legal? In other words, does the data belong to a data set created or designed to be accessed by the data retrieval system? It should not be meaningless, or in a format not readable by the retrieval system (such as a bitmap). Further, is it the particular data set we want to access rather than a different or out-of-date data set?

(2) Validity. Should the data be present in this data set? Is this data that was created with the original version of this data set? If the query is looking for data that was updated during prior testing, is this updated data or the old data? If the query is looking for data in a record where an update was aborted or reversed, is this the original data or the aborted data that should not have been committed to the data set?

(3) Category. Is this the correct data type? When the test program attempted to retrieve a phone number, was a phone number actually retrieved? Or was a job title retrieved instead?

(4) Owner. Does the data belong to the desired record? If the query asked for data from John Smith's record, did we get something from Jane Smith's record instead?

(5) Accuracy. Is the data accurate? Is this phone number for John Smith in fact correct or have the digits been transposed or garbled?

The present invention incorporates the verification information for all five levels into the data set itself, thus eliminating the need for an oracle.

Figure 5:
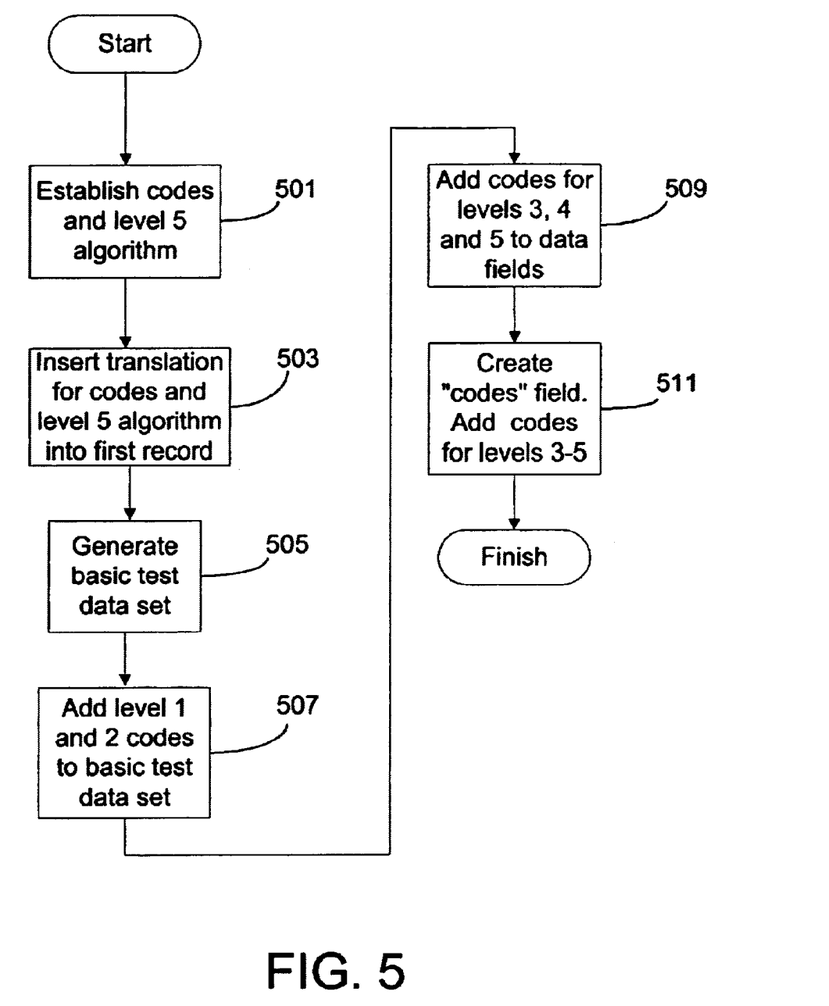
FIG. 5 is a flowchart describing the process of creating a data set according to the present invention.

The present invention can create an employee record using the same information fields as the conventional employee record of FIG. 3 by following the procedure outlined in FIG. 5. In step 501, the tester establishes a set of codes to be placed in the data set. The codes answer the first four test questions discussed above. Additionally, the tester establishes a checksum, CRC, frame check, parity check, block check sequence, or similar well-known algorithm for level 5 testing. The tester inserts the translation keys for level 1–4 codes as well as the key for the level 5 algorithm into the data set as shown in step 503. In a preferred embodiment of the invention, the translation and algorithm keys are inserted into the first record of the data set. This first record has an "employee number" of 0000000 and is used by a test engineer or automated test program as a look-up table for deciphering the codes and the level 5 mechanism. For some data sets, other record numbers or storage locations in the data set are more convenient.

A basic test data set is then generated using conventional test methodology in step 505. In step 507, the tester adds the codes for levels 1 and 2 to the basic data set. The codes are added to the fields of the basic test data set that can accept them. For those fields that require a special format (such as date and numeric fields), the level 1 and level 2 codes are placed in separate "codes" fields.

At steps 509 and 511 respectively, codes for levels 3–5 are added directly to all "unique" fields or placed in separate "codes" fields for "shared" fields. To illustrate the terms "unique" and "shared," reference is made to the conventional employee record of FIG. 3. In this example, the employee's email alias is considered "unique" in that no other employee in the test data set shares this email alias value. This is also true for this employee's first and last name, room location, work phone number, and job title. The "employee number" of an employee's manager, represented by "reports to," is considered a "shared" field, since several employees in this data set may report to the same manager. The same is true for "works in," which represents the employee's work group. It is preferable to create a separate field for the codes of shared categories, since appending an employee number to a field renders the field "unique," making a query such as "retrieve the last names of all employees reporting to employee number 0000102" difficult. A variety of data types may be shared, and it is up to the tester to make this determination. "Unique" fields that can't accept the codes are treated as "shared" fields.

Because the invention stores the verification codes along with the actual data, the codes are constructed from characters recognizable by the data retrieval system. Since data retrieval systems process groups of characters of the same "equivalence class" in the same manner, the tester chooses the characters used for the codes from the same equivalence class as the data being tested. Also, the characters chosen for the codes are excluded from the actual data. This restriction helps both human testers and automated test programs avoid confusing real data with the verification codes.

Figure 2:
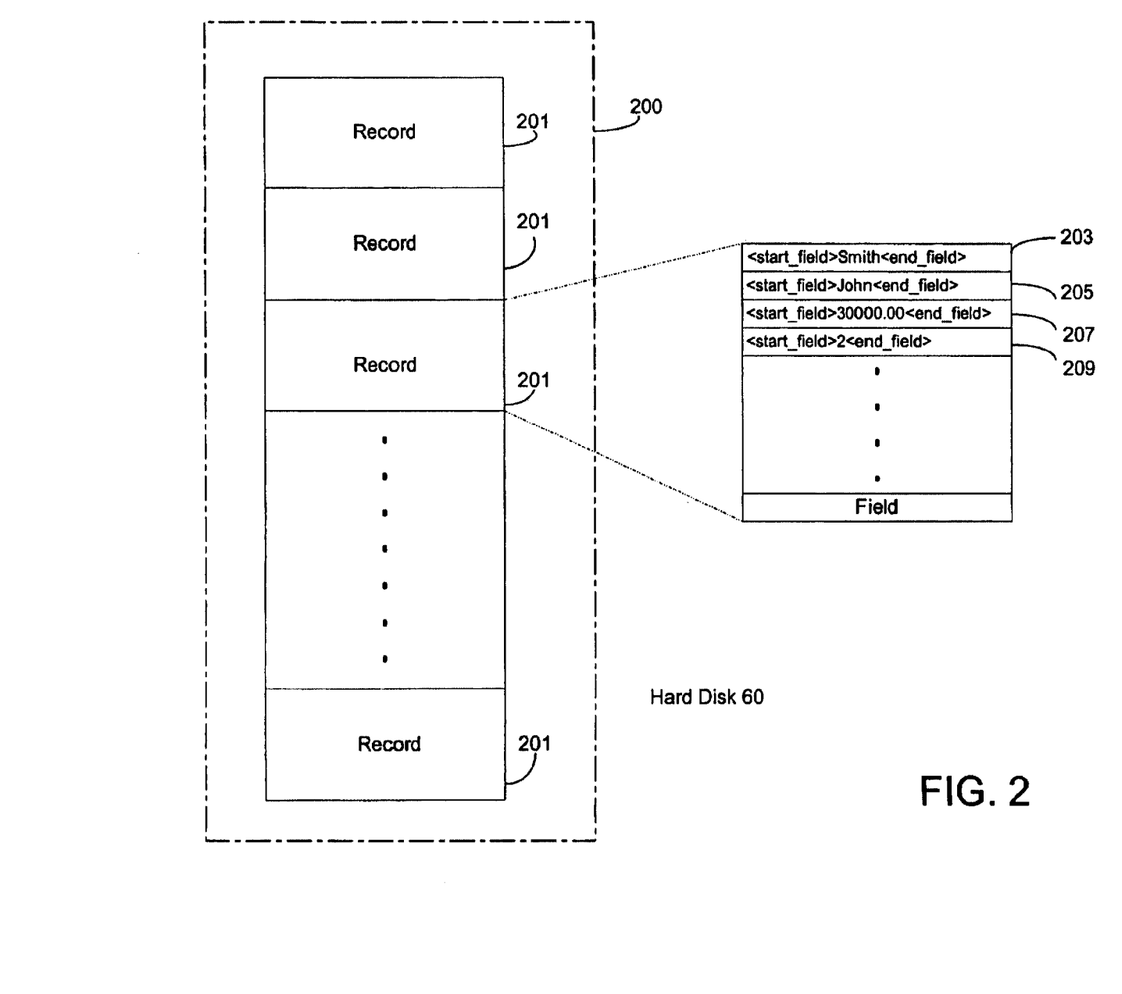
FIG. 2 shows the basic structure of a conventional data set.

To generate a data set having records organized like the conventional employee record of FIG. 2, the tester could use combinations of the letters K, k, Q, q, W, w, X and x as codes. Thus, no employee data (first name, last name, job title, etc.) would contain these letters in such a code scheme. Excluding the letters K, k, Q, q, W, w, X and x creates little risk of tainting the testing procedure as long as the data entries still contain other letters belonging to the same equivalence class. For other data sets, other unique codes, such as special punctuation, foreign language characters, or binary characters created for the purpose of verification could be used instead of these letters. The present invention does not require any particular coding characters to be used and the verification schemes described can be applied regardless of the exact nature of the characters used in the codes.

Figure 6:
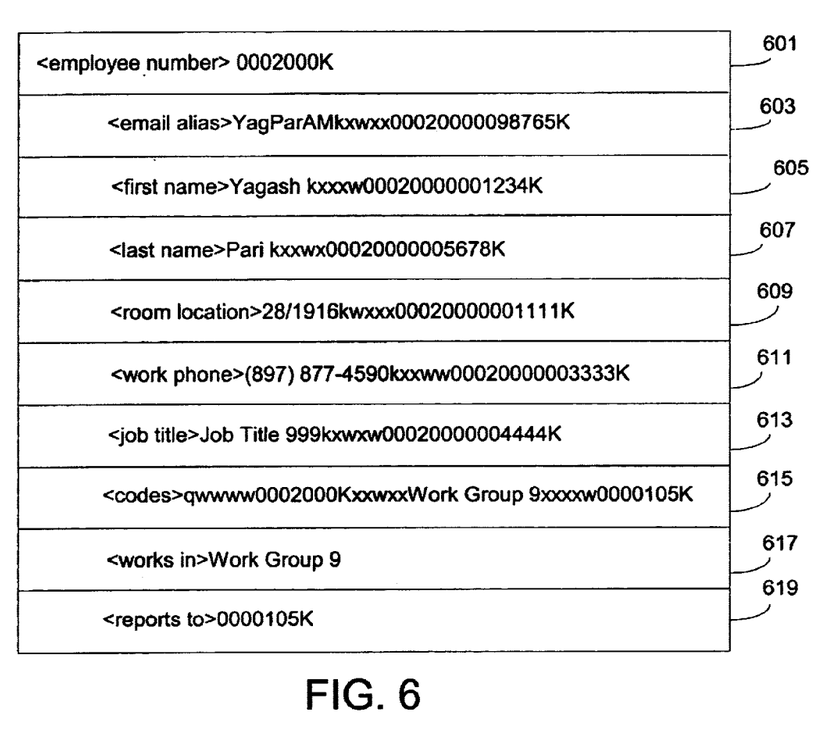
FIG. 6 shows an exemplary data record from a data set created according to the present invention.

The exemplary record of FIG. 6 contains the same data as the conventional record of FIG. 3, but uses a "K k q w X x" code scheme according to the present invention:

Level 1—Legality. The presence of any character other than a K or X in the last character of the data field indicates illegal data. At this level of testing, no distinction is made between the two letters. For some types of testing, it is preferable to embed the verification codes in the middle of, rather than append them to, the data values. For those circumstances, a more complex combination of K and X characters would be used.

Level 2—Validity. This is indicated by which of the two "legal" characters occupies the last position.

K: Indicates that the data has existed from the time the data set was created and has not been deleted.

X: Indicates that the data has been updated and is not data from the original data set.

Level 3—Category. A combination of k's, q's, x's and w's connotes the category:

kxwxx=email alias
kxxxw=first name
kxxwx=last name
kwxxx=room location
kxxww=work phone
kxwxw=job title
xxxxw=reports to
xxwxx=works in
qwwww=codes Level 4—Owner. The "employee number" is inserted into the data field or codes field for this level of verification.

Level 5—Accuracy. A CRC is calculated on the data value and appended to the data field or the "codes" field for each value. Because both the employee number and the value from the checksum, CRC or similar algorithm are numeric values, the invention provides several methods for delineating them. In the exemplary data for FIG. 6, the employee numbers and the CRC values are both fixed at seven digits. The numbers are prefixed with zeroes as necessary to ensure that each is exactly seven digits long. A test program according to the present invention can parse fields for the employee number and accuracy values using that fixed length. Other methods for delineating the values might be used, such as, but not limited to: placing the level 2 valid data code between the employee number and the accuracy value, using a separate accuracy verification code between the employee number and accuracy value, or using a separate special delimiter between the employee number and accuracy value. The tester appends the level 1–5 codes to the data fields of the unique categories, as the entries 603–613 of the exemplary employee record of FIG. 6 show. FIG. 6 also shows that the code for the "reports to" field 619 is located in the separate "codes" field 615. The "reports to" field 619 itself has only the base code "K" appended to it. All legal entries that can accept an alphabetic code have the base code K. If a "codes" field cannot be added to the data set for testing purposes, the codes for the unique data can be inserted into existing fields that are not being tested.

Figure 7:
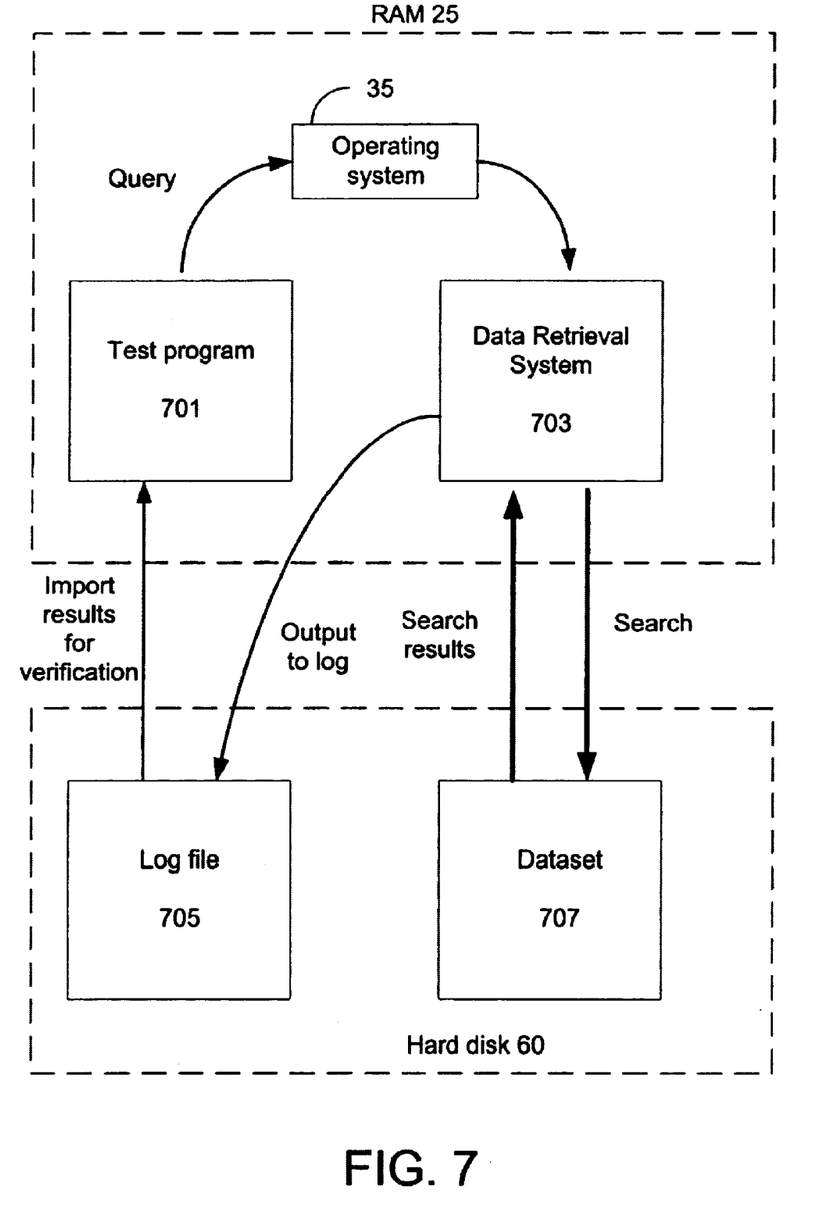
FIG. 7 is a diagram illustrating the overall flow of a preferred embodiment of the invention.

A preferred embodiment of the invention has several interacting components, as shown in FIG. 7. A test program 701 submits a set of queries to a data retrieval system 703 via the operating system 35 using a well known technique of interprocess communication. In a preferred embodiment of the invention, the data retrieval system 703 is a database program. The query set is selected by the tester according to a well known method of data retrieval testing. The queries are conventionally structured to cause the data retrieval system 703 to retrieve the corresponding "codes" field, where appropriate, in addition to the data fields. The data retrieval system 703 searches a data set 707 (stored on the hard disk 60) and imports the queried entries. The data retrieval system 703 then records the results in a log file 705, also located on the hard disk 60. The test program 701, data retrieval system 703, log file 705, and data set 707 may be located on any of a number of parts of the exemplary environment of FIG. 1. For example, the test program 701 and the data retrieval system 703 may be run in parallel on two separate computers on a network, while the log file 705 and the data set 707 may be also be located separately. Furthermore, it is not necessary that the test program 701 and the data retrieval system 703 run concurrently in the RAM 25, as shown in FIG. 7.

Figure 8:
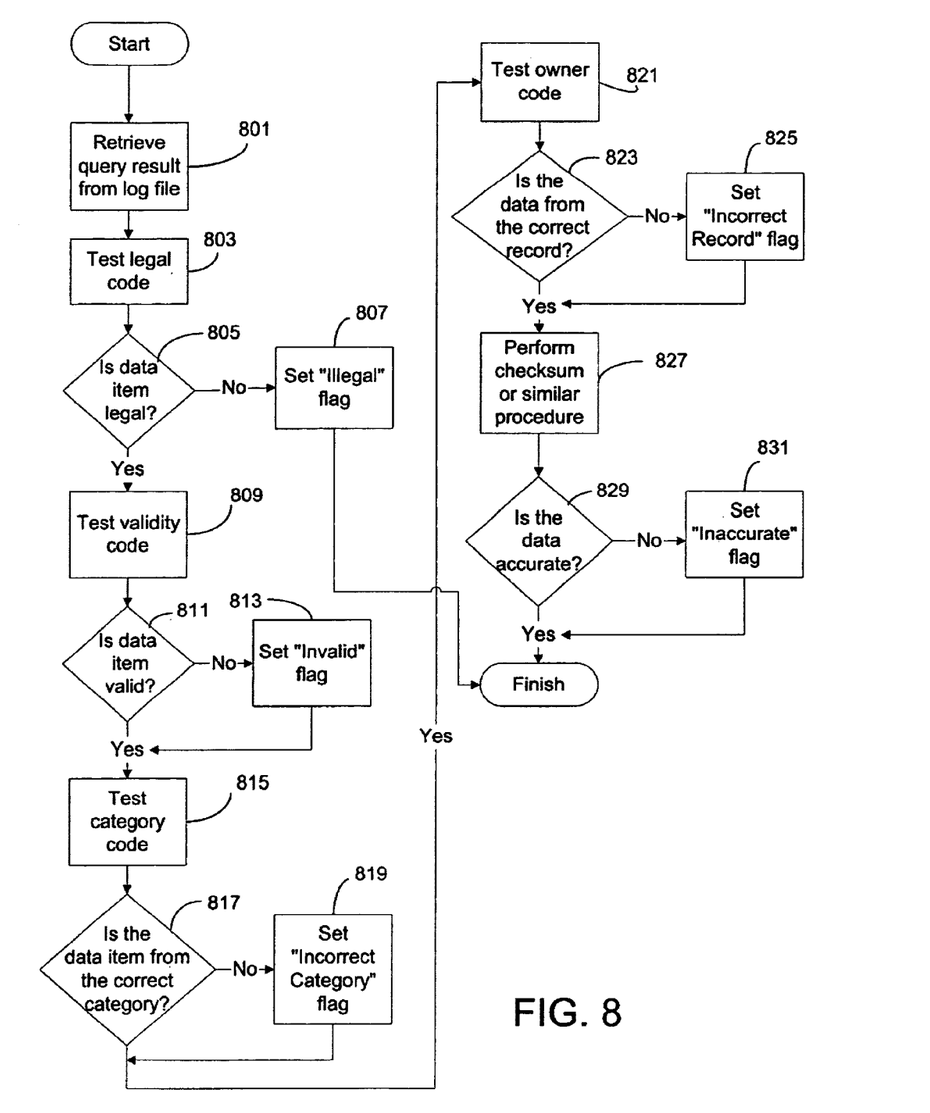
FIG. 8 is a flowchart showing how a test query is verified according to the invention.

The test program 701 imports and verifies the test results from the log file 705 according to the flow chart of FIG. 8. At step 801, the test program 701 retrieves a query result from the log file 705. A query result is comprised of a field containing data plus an appended code (for unique data) or a data field and a "codes" field (for shared data or unique data in fields that can't accept the codes). In steps 803 through 831, the test program 701 verifies that the data is legal, valid, of the correct category, owned by the correct record, and accurate. If the level 1 code is incorrect at step 805, the test procedure ends, since it is unlikely that any of the other test levels would succeed given that the data retrieved is illegal. If any of the verification levels results in an unexpected value, the test program 701 sets a corresponding flag to indicate an error.

One example of a test query would be for the test program 701 to ask the data retrieval system 703 to find the email alias, first name, and last name of a random employee. According to the invention, the test program 701 would submit this query and verify its results using the procedure shown in FIG. 9. At step 901, the test program 701 generates a random number N between 1 and the number of the last employee record. In steps 903 and 905, the test program 701 queries the data retrieval system 703 to retrieve the email alias, first name, and last name of employee N.

A query for employee number 0002000, shown in the exemplary record of FIG. 6, should yield:

First name=Yasash kxxxw00020000001234K

Last name Pari kxxwx00020000005678K

Email alias m YagParAMkxwxx00020000098765K

Figure 9:
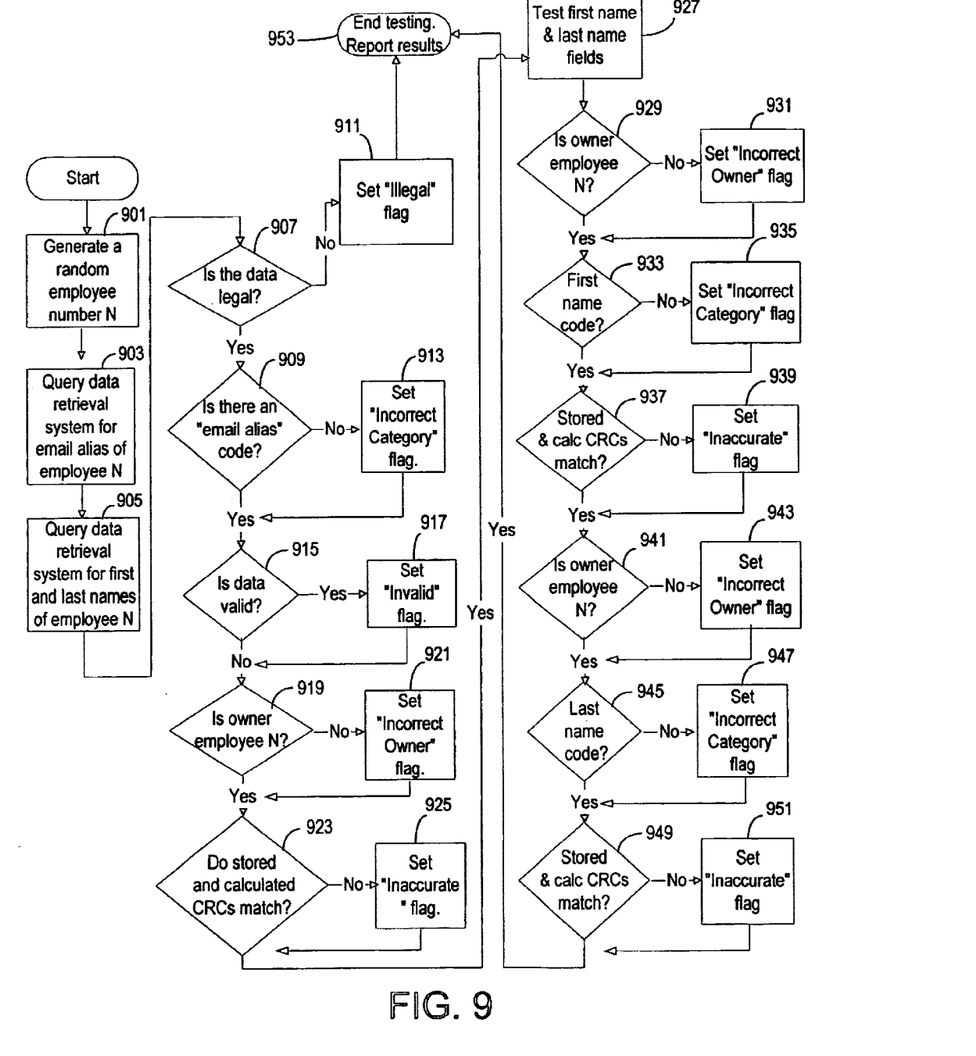
FIG. 9 is a flowchart of an example verification.

In this example, the string "kxwxx" is the five-letter code for "email alias." The string "0002000" is the employee number. The string "0098765" is the CRC for the data value "YagParAM". The letter "K",at the end of the three values is the "Legal original data" code. The test program 701 examines the result for level 1 verification at step 907. If the last character is a K, the test program 701 recognizes that this data is the original data used when the data set was created. If the last character is an X, the test program 701 recognizes that this data was updated in previous testing and should not have been retrieved by the data retrieval system 703. For tests that specifically query for data known by the tester to have been updated, the last character must be an X and not a K. If the retrieved entry does not have a K or X in the last position, the test program 701 sets the "Illegal" flag to indicate the presence of an unrecognizable entry, and the test procedure then terminates at step 953.

If the data is legal, the test program 701 verifies the data values using the remaining four levels in steps 909 through 925. The test program should find the "email alias" code of "kxwxx," indicating that the data belongs to the correct category. To verify that the entry being examined does belong to employee 0002000, the test program 701 checks verifies that the digits "0002000" follow the category code in step 919. If these digits are not present, the test program 701 sets the "Owner" flag at step 921. Finally, the test program 701 perform the CRC at step 923 on the retrieved email alias data value and compares it with the stored CRC value "0098765" to verify that the email alias is the correct email alias for employee 0002000. The test program 701 then performs a verification of the first name and last name of employee 0002000 in steps 929 through 951.

Figure 10:
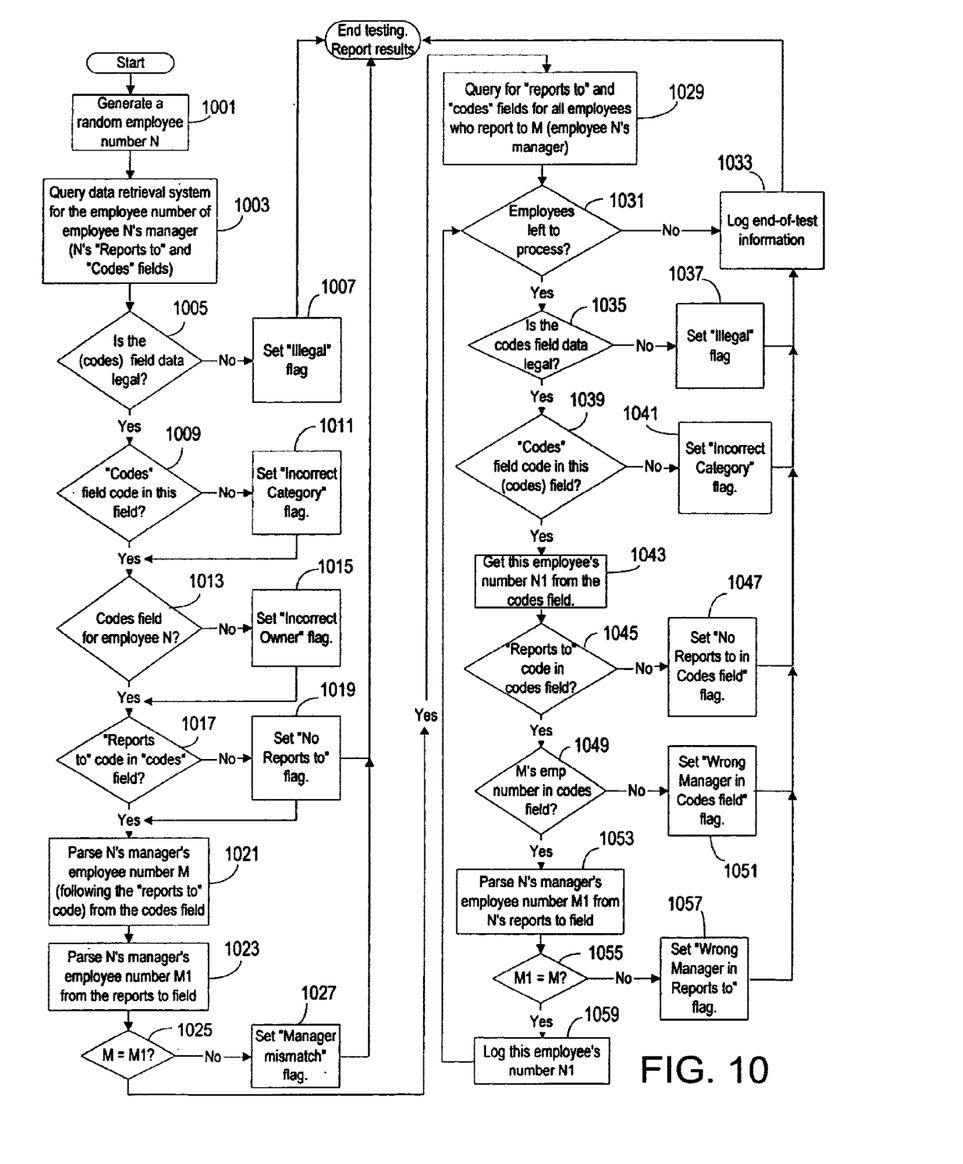
FIG. 10 is a flowchart of another example verification.

A more complex example using the present invention is for the test program 701 to prompt the data retrieval system 703, as described in FIG. 10, to find the employee number of a random employee's manager, and then locate all other employees having the same manager. At step 1001, the test program 701 generates a random number N between 1 and the number of the last employee record. The test program then queries data retrieval system 703 to locate the employee number of employee N's manager, and using N's manager's employee number, to further locate the employee numbers of all other employees having the same manager. The data retrieval system 703 records the results of the query to log file 705. For example, if N=0002000 (the employee number of the record shown in FIG. 6), the query should yield:

Manager's Employee Number ("reports to")=00001105K,

Codes=gwwww0002000KxxwxxWork Group 9xxxxw0000105K.

In this example, the string "0000105" in the retrieved data for the Manager's Employee Number is the value of the manager's employee number, while the "K" suffix is the "Legal original data" code. In the retrieved data for the Codes, the string "qwwww" is the Codes field verification code. The subsequent string "0002000K" is the Number and Legal/Valid code for employee 0002000K who "owns" this codes field. The "xxwxx" string is the Worksfor data verification code. The "Work Group, 9" string is the employee's shared work group name." The string "xxxxw" is the Reportsto data verification code. The string "0000105K" is this employee's manager's employee number and legal/valid code.

The query would retrieve the "codes" fields for other employees with same manager:

Codes=qwwww(second employee number)KxxwxxWork Group 9xxxxw00105K

Codes=qwwww(third employee number)KxxwxxWork Group 9xxxxw0000105K (etc.)

Codes=qwwww(nth employee number)KxxwxxWork Group 9xxxxw000105K

Note that the query retrieved the "codes" fields as well as the "reports to" fields. The query was structured to do this because "reports to" is a shared category and therefore the data in the "reports to" field does not contain verification codes for levels 3–5. If the "reports to" field contained unique codes, then searching for all employees with a particular manager would require parsing the data value itself, which may not be desirable when testing many data retrieval systems.

The test program 701 checks the verification codes in the "codes" field to ensure that the data is legal, from employee N's records, and is the correct "codes" category in steps 1005 through 1015. One major difference between verifying this query and verifying the query of FIG. 9 is that in this query, the self-verifying codes for levels 3, 4 and 5 for the "reports to" field are located in the separate "codes" field. The test program 701 in steps 1017 and 1019 checks for the presence of a "reports to" level 3 verification code, but looks for it in the employee's "codes" field. If the "reports to" verification field is found in the "codes" field, test program 701 parses the value immediately following the "reports to" code as the value of employee N's manager's employee number, step 1021. Rather than use an employee number in the "reports to" field for level 4 verification and the CRC for level 5 verification, the test program 701 compares the value for the manager's employee number stored in the "reports to" field and the value identified with the "reports to" verification code in the "codes" field in step 1025. If the two values are identical, the data passes both level 4 and level 5 verification.

Next the test program 701 uses employee N's manager's employee number M to prompt the data retrieval system 703 for the "reports to" and "codes" fields for all employees who report to employee M, step 1029. Steps 1031 through 1061 form a loop in which the test program processes all employee "reports to" and "code" fields returned by the query in step 1029. In steps 1035 through 1043, the test program 701 verifies that the "codes" field for each employee is from a legal data set and is the proper category. Then, in step 1043, the test program 701 extracts the current employee's number for logging later. In steps 1045 through 1051, test program 701 verifies that this employee's "codes" field contains a "reports to" code (meaning this employee has a manager) and that the employee number following that "reports to" code has the same value as M, the employee number of employee N's manager. Finally, in steps 1053 through 1057, the test program 701 verifies that a "reports to" field was returned and that the manager's employee number in that field has the same value as the manager's employee number M. The loop comprised of steps 1031 through 1059 repeats until all employee "reports to" and "codes" fields returned by the query have been processed. The loop terminates early if processing an employee results in a test failure.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method of testing a data retrieval system comprising the steps of: receiving a query for information from a data set, the data set comprising a plurality records, each of the plurality of records having a plurality of fields; retrieving, using the data retrieval system, a data value and a code from a record in a data set, the code being correlated to an attribute of the data value, and located in the same field of the same record as the data value; and analyzing the code to determine the correctness of the attribute, wherein the data retrieval system is deemed defective if the attribute is incorrect.

2. The method of claim 1, wherein the analyzing step comprises the step of interpreting the code to determine whether the data value is legal.

3. The method of claim 1, wherein the analyzing step comprises the step of interpreting the code to determine whether the data value is valid.

4. The method of claim 1, wherein the record is organized into a plurality of categories, and the analyzing step comprises the step of interpreting the code to determine whether the data value corresponds to the correct record category.

5. The method of claim 1, wherein the analyzing step comprises the step of interpreting the code to determine whether the data value has been retrieved from the correct record.

6. The method of claim 1, wherein the record has a corresponding owner, and the analyzing step comprises the step of interpreting the code to determine whether the data value is accurate.

7. The method of claim 6, wherein the code is a checksum.

8. The method of claim 6, wherein the code is a cyclical redundancy check.

9. The method of claim 6, wherein the code is an error correcting code.

10. The method of claim 6, wherein the code is a frame check sequence.

11. The method of claim 6, wherein the code is a parity check code.

12. The method of claim 6, wherein the code is a block check sequence.

13. A method of conducting a test on a data retrieval system, the method comprising the steps of: creating a data set comprising a plurality of records, each of the plurality of records containing a plurality of fields, each of the plurality of fields containing one more data values; for at least one of the plurality of records, inserting into a field of the plurality of fields a code that indicates that a particular data value contained in one of the plurality of fields is of the type that the data retrieval system is designed to access; submitting a query to the data retrieval system; receiving a response containing data retrieved by the data retrieval system in response to the query; if the code is present in the response, deeming the test to be a success; and, if the code is not present in the response, deeming the test to be a failure and the data retrieval system to be defective.

14. The method of claim 13, wherein the code comprises one or more text characters.

15. The method of claim 13, wherein the inserting step comprises inserting the code into the same field as the particular data value.

16. The method of claim 13, wherein the data retrieval system comprises a database program, and the query is submitted to the database program.

17. A method of testing a data retrieval system, the method comprising the steps of: creating a data set comprising a plurality of records, each of the plurality of records containing a plurality of fields, each of the plurality of fields containing one or more data values; for at least one of the plurality of records, inserting into a field of the plurality of fields a code that indicates the version of the data set to which a particular data value contained in the data record belongs; submitting a query to the data retrieval system; receiving, from the data retrieval system in response to the query, the particular data value along with the code; and, based on an analysis of the code, determining whether the particular data value belongs to a correct version of the data set, wherein the data retrieval system is deemed defective if the particular data value does not belong to a correct version of the data set.

18. The method of claim 17, wherein the determining step comprises determining whether the particular data value should have been deleted from the data set, but was not.

19. The method of claim 17, wherein the determining step comprises determining whether the particular data value should have been previously updated, but was not.

20. The method of claim 17, wherein the code comprises one or more text characters.

21. The method of claim 17, wherein the inserting step comprises inserting the code into the same field as the particular data value.

22. The method of claim 17, wherein the data retrieval system comprises a database program, and the query is submitted to the database program.

23. A method of testing a data retrieval system, the method comprising the steps of: creating a data set comprising a plurality of records, each of the plurality of records comprising data describing a plurality of characteristics of a particular person, place, or thing, each of the plurality of records containing a plurality of fields; for at least one of the plurality of records, insetting into a field of the plurality of fields a code that indicates the characteristic of the person, place or thing that a particular data value in the record describes; submitting a query to the data retrieval system for information regarding the characteristic of the person, place or thing; receiving, from the data retrieval system in response to the query, the particular data value along with the code; and, based on the code, determining whether the correct characteristic regarding the person, place or thing has been retrieved by the data retrieval system, wherein the data retrieval system is deemed defective if the correct characteristic has not been retrieved the data retrieval system.

24. The method of claim 23, wherein the code comprises one or more text characters.

25. The method of claim 23, wherein the inserting step comprises inserting the code into the same field as the particular data value.

26. The method of claim 23, wherein the data retrieval system comprises a database program, and the query is submitted to the database program.

27. A method of testing a data retrieval system, the method comprising the steps of: creating a data set comprising a plurality of records, each of the plurality of records associated with a particular person, place, or thing, each of the plurality of records containing a plurality of fields and a plurality of data values, each of the plurality of fields containing at least one of the plurality of data values, the data value representing information about the particular person, place, or thing; for at least one of the plurality of records, inserting into a field of the plurality of fields a code that indicates the identity of the particular person, place or thing, the code being associated with one of the plurality of data values; submitting a query to the data retrieval system for information regarding the characteristic of the person, place or thing; receiving, from the data retrieval system in response to the query, a data value of the plurality of data values along with the code associated with the data value; and, based on an analysis of the code, determining whether the received data value describes the person, place or thing that is the subject of the query or describes some other person, place or thing, wherein the data retrieval system is deemed defective if the received data value does not describe the person, place or thing that is the subject of the query or describes some other person, place or thing.

28. The method of claim 27, wherein the code comprises one or more text characters.

29. The method of claim 27, wherein the inserting step comprises inserting the code associated with the data value into the same field as the data value.

30. The method of claim 27, wherein the data retrieval system comprises a database program, and the query is submitted to the database program.

31. The method of claim 27, wherein the determining step comprises determining whether the data value describes something that is specific to the person, place or thing that is the subject of the query.

32. A method of testing a data retrieval system, wherein the data retrieval system has access to a data set that comprises a plurality of records, the data set having a plurality of versions, the method comprising: querying the data retrieval system for a data item that describes a characteristic of a particular person, place, or thing; receiving, from the data retrieval system in response to the query, a data record of the plurality of data records; performing a first level of verification by searching the record for one or more codes indicating that the data item is of a type that the data retrieval system is designed to retrieve; performing a second level of verification by searching the record for one or more codes that indicate which version of the data set the data item belongs to; performing a third level of verification by searching the record for one or more codes that indicate which characteristic of the person, place or thing that the data item describes so as to determine whether the data item describes the correct characteristic; and performing a fourth level of verification by searching the record for one or more codes that indicate which person, place or thing the data item is associated with so as to determine whether the correct data record has been retrieved, wherein the data retrieval system is deemed defective if the received record fails any of the levels of verification.

* * * * *

UNITED STATES PATENT AND TRADEMARK OFFICE
CERTIFICATE OF CORRECTION

PATENT NO. : 6,694,459 B1
DATED : February 17, 2004
INVENTOR(S) : Nyman

It is certified that error appears in the above-identified patent and that said Letters Patent is hereby corrected as shown below:

<u>Title page, Column 2, lines 8-10,</u>
Delete "NN9607231: Encoded...231 234" duplicate entry.

<u>Column 3,</u>
Line 12, "is 5" should be deleted.

<u>Column 8,</u>
Line 13, "Yasash" should read -- Yagash --.
Line 15, "alias m" should read -- alias --.
Line 62, "00001105K" should read -- 0000105K --.

Signed and Sealed this

Thirteenth Day of July, 2004

JON W. DUDAS
*Acting Director of the United States Patent and Trademark Office*